United States Patent [19]

Tajiri et al.

[11] Patent Number: 4,652,767
[45] Date of Patent: Mar. 24, 1987

[54] READING APPARATUS WITH NOISE REDUCTION

[75] Inventors: Hiromitsu Tajiri; Yasuo Nishiguchi; Chiaki Matsuyama, all of Kagoshima, Japan

[73] Assignee: Kyocera Corporation, Japan

[21] Appl. No.: 793,667

[22] Filed: Oct. 31, 1985

[30] Foreign Application Priority Data

Nov. 23, 1984 [JP] Japan ................. 59-248310

[51] Int. Cl.$^4$ ................................ H04N 5/213
[52] U.S. Cl. ................................ 250/578; 358/167; 358/213
[58] Field of Search ............ 250/211 J, 578; 357/30, 357/31, 32; 358/167, 212, 213, 293

[56] References Cited

U.S. PATENT DOCUMENTS 4,145,721  3/1979  Beaudouin et al. ............ 358/167
4,189,749  2/1980  Hiroshima et al. ............ 358/213
4,511,804  4/1985  Ozawa .......................... 358/213

Primary Examiner—David C. Nelms
Assistant Examiner—S. Allen
Attorney, Agent, or Firm—Spensley Horn Jubas & Lubitz

[57] ABSTRACT

A reading apparatus including a first group of photo-detection units, the first group of photo-detection units including a first plurality of photo-detection units each including a photo-detector constituted by a photodiode and an electric charge storage capacitor connected in parallel therewith, and an analog switch connected in series with the photo-detector thus constituted, a second group of photo-detection units, the second group of photo-detection units including a second plurality of photo-detection units each also including a photo-detector constituted by a photo-diode and an electric charge storage capacitor connected in parallel therewith, and an analog switch connected in series with the photo-detector thus constituted, the second plurality of photo-detection units being substantially equal in number to the first plurality of photo-detection units, a control system for rendering the switches conductive successively one at at time, a first common line for commonly delivering detecting signals from the first group of photo-detection units, a second common line for commonly delivering detecting signals from the second group of photo-detection units, an operational amplifier circuit having a pair of input terminal, one input terminal thereof being supplied with the detecting signals sent from the first common line, while the other input terminal thereof being supplied with the detecting signals sent from the second common line, the operational amplifier circuit being adapted to sum up the detecting signal given to the one input terminal thereof and the inverted signal of the detecting signal given to the other input terminal thereof.

6 Claims, 3 Drawing Figures

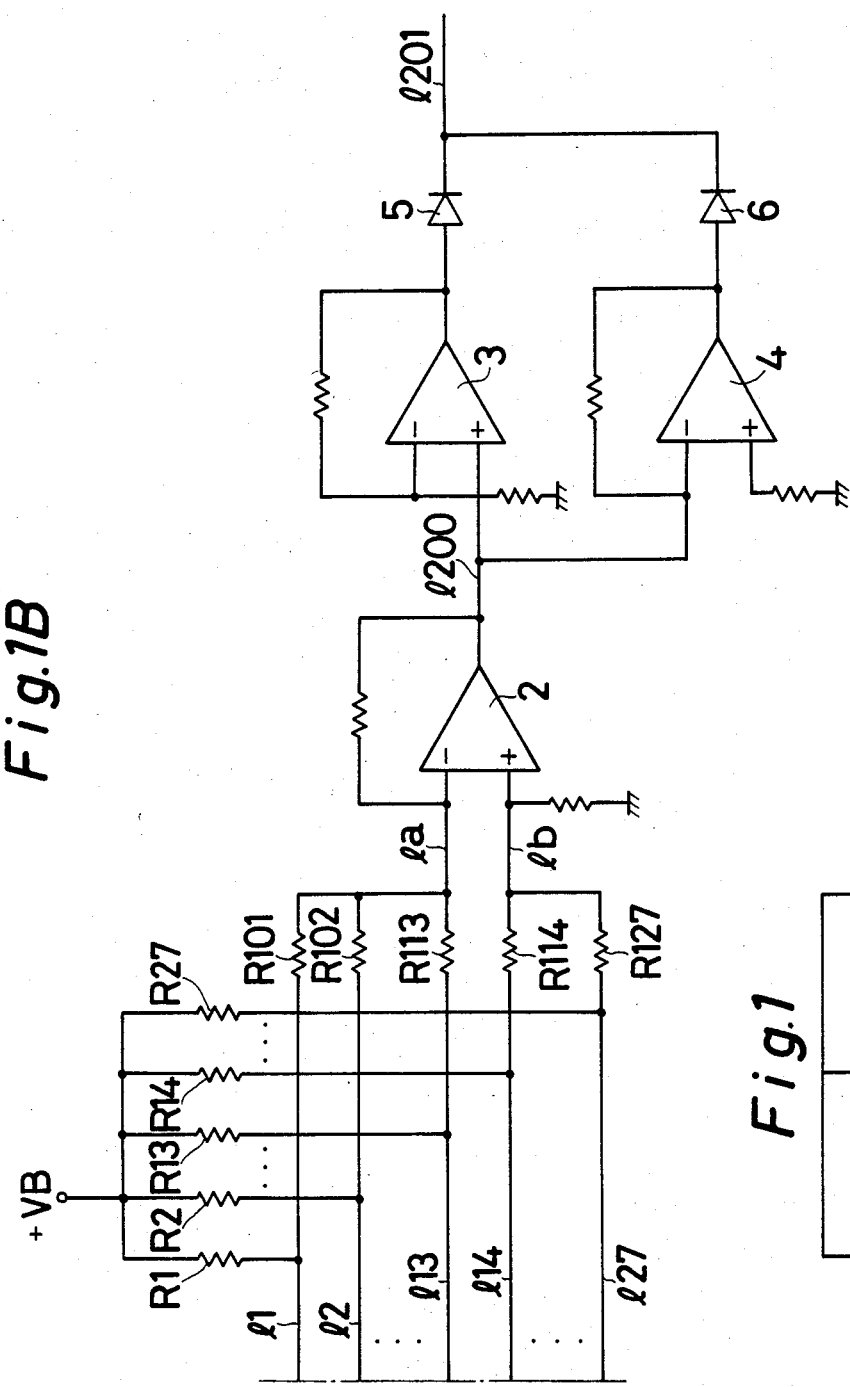

READING APPARATUS WITH NOISE REDUCTION

BACKGROUND OF THE INVENTION

1. Field of the Invention

The present invention relates to a reading apparatus, and more particularly to a reading apparatus for optically reading an original document.

2. Description of the Prior Art

In a facsimile transmitter or the like, a plurality of photo-detectors are provided along the widthwise direction of an original document to optically read the document. These photo-detectors receive a reflected portion of light from the original document after the light is emitted to the document, and a photoelectric current flows. Such photoelectric current needs to be successively read. In such successive reading of photo-detectors, noise is included in detecting signals as a result of reading performance and consequently the signal to noise ratio is decreased, which would lead to error detection.

SUMMARY OF THE INVENTION

With a view to solving the aforementioned problem, it is an object of the invention to provide a novel and improved reading apparatus.

It is another object of the invention to provide a reading apparatus adapted such that serial photo-detecting signals with excellent signal to noise ratio can be obtained by inhibiting the introduction of noise into the detecting signals in successively reading a plurality of photo-detectors.

In order to accomplish the above objects, a reading apparatus according to the invention comprises: a first group of photo-detection units, said first group of photo-detection units comprising a first plurality of photo-detection units each comprising a photo-detector and a switch connected in series therewith; a second group of photo-detection units, said second group of photo-detection units comprising a second plurality of photo-detection units each comprising a photo-detector and a switch connected in series therewith, said second plurality of photo-detection units being substantially equal in number to said first plurality of photo-detection units; control means for rendering said switches conductive successively one at a time; a first common line for commonly delivering detecting signals from the first group of photo-detection units; a second common line for commonly delivering detecting signals from the second group of photo-detection units; operational means having a pair of input terminals, one input terminal thereof being supplied with the detecting signal sent from the first common line, the other input terminal thereof being supplied with the detecting signal sent from the second common line, said operational means being adapted to sum up the detecting signal applied to the one input terminal and the inverted signal of the detecting signal applied to the other input terminal.

In a preferred embodiment, said first group of photo-detection units fall into subgroups each comprising a third plurality of photo-detection units which are smaller in number than said first plurality of photo-detection units, and common sub-lines are provided which are individually associated with the respective said subgroups of photo-detection units in said first group whereby said third plurality of photo-detection units in each said subgroup commonly apply outputs thereof to said common sub-line, and said common sub-lines are commonly connected with said first common line.

In another embodiment, said second group of photo-detection units fall into subgroups each comprising a fourth plurality of photo-detection units which are smaller in number than said second plurality of photo-detection units, and common sub-lines are provided which are individually associated with the respective said subgroups of photo-detection units in said second group whereby said fourth plurality of photo-detection units in each said subgroup commonly apply outputs thereof to said common sub-line, and said common sub-lines are commonly connected with said second common line.

Preferably, a reading apparatus according to the invention further comprises: a first buffer for delivering the output from said operational means at the same polarity; a second buffer for delivering the output from said operational means at the opposite polarity; and means for summing up the outputs from said first and second buffers.

Still preferably, said control means comprises: AND gates, individually associated with respective said switches, for yielding signals to control on/off actions of said switches; means for commonly applying a square wave pulse to one inputs of said AND gates; and a shift register for applying a square wave pulse to the other inputs of said AND gates successively one at a time and synchronously with applying of the square wave pulse by said pulse applying means.

In a further preferred embodiment, said shift register comprises cascaded D-type flip-flops.

In accordance with the invention, serial detecting signals are produced by two groups of photo-detection units, and detecting signals from one common line for one group of photo-detection units and inverted signals of detecting signals from the other common line for the other group are summed up, thereby canceling the noise which results from reading operation to be consequently transmitted to the common sub-lines. Accordingly serial detecting signals with inhibited noise components can be obtained. Since the photo-detection units of the two groups are determined to be substantially equal in number to each other, the amounts of noise components introduced into the two common lines are likewise substantially equal to each other, thus surely effecting the inhibition of noise components introduced into the two common lines.

BRIEF DESCRIPTION OF THE DRAWINGS

These and other objects, features and advantages of the invention will become more apparent upon a reading of the following detailed specification and drawings, in which:

FIGS. 1A and 1B are electric circuit diagrams of an embodiment of the invention.

DETAILED DESCRIPTION OF THE PREFERRED EMBODIMENTS

Figure 1A:
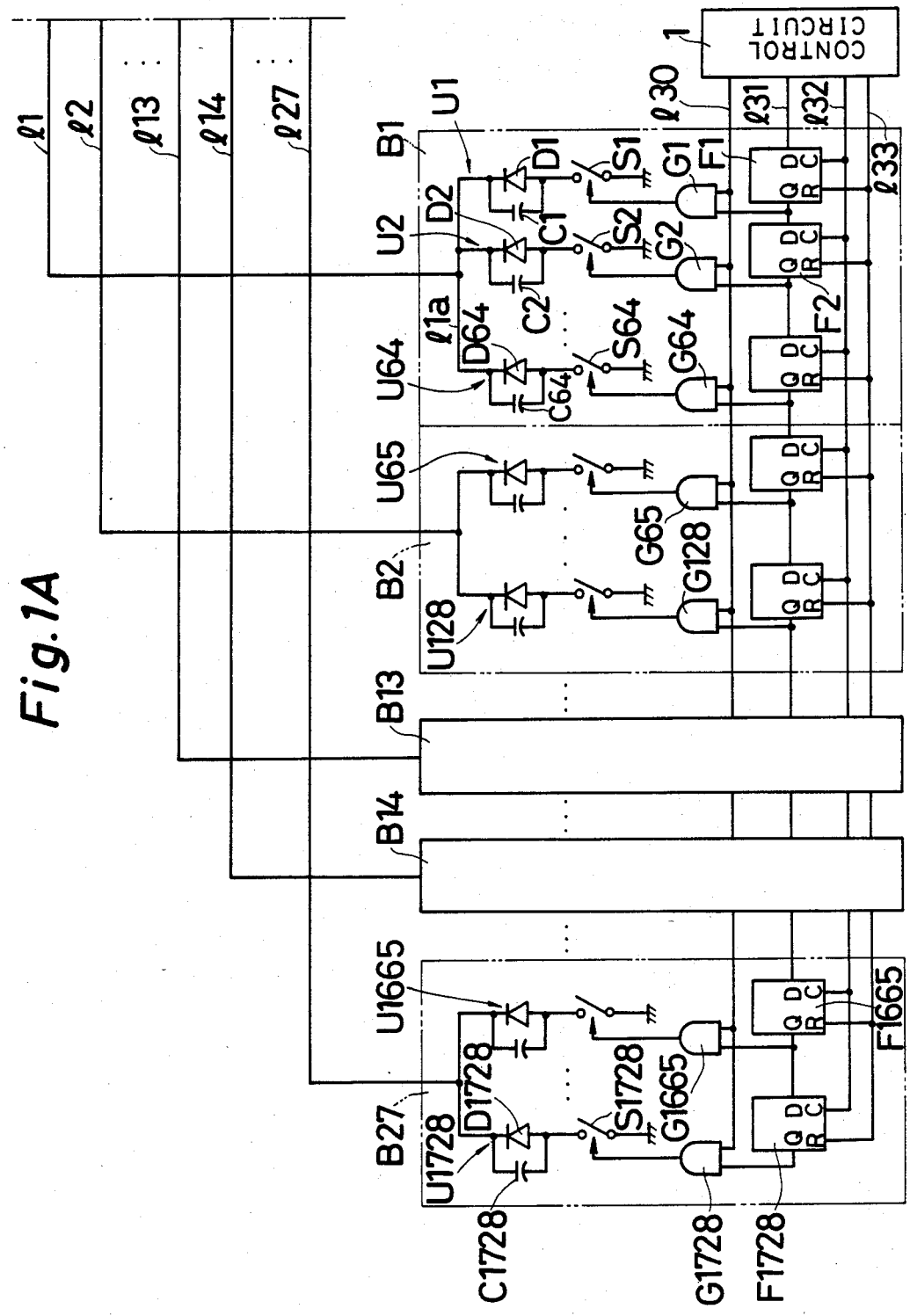

Referring now to the drawings, preferred embodiments of the invention are described in detail below.

FIG. 1 is an electric circuit diagram of an embodiment of the invention. In a facsimile transmitter, a plurality of photodiodes D1 to D1728 (1,728 photodiodes in this embodiment) as photo-detectors are so arranged as to be adjacent to one another along the widthwise direction of an original document or the like and perpendicularly to the running direction of the document, to optically read reflected light from the original document. Electric charge storage capacitors C1 to C1728 are connected in parallel with these photodiodes D1 to D1728, respectively. An analog switch S1 is connected in series with a parallel circuit of the photodiode D1 and charge storage capacitor C1, thus constituting a photo-detection unit U1. The other photo-detection units U2 to U1728 are constituted similarly. These photo-detection units U1 to U1728 fall into two groups. One group includes 13 photo-detection circuits B1 to B13, while the other group includes 14 photo-detection circuits B14 to B27 which are substantially equal in number to those of the one group. Each of the photo-detection circuits B1 to B27 includes 64 photo-detection units, i.e. U1 to U64; U65 to U128; ... ; U1665 to U1728. Thus, the photo-detection units U1 to U1728 divided into two groups as mentioned above, further falls into subgroups each of which includes 64 photo-detection units and belongs to one of the photo-detection circuits B1 to B27. The subgroups of photo-detection units are individually connected with common sublines lines l1 to l27.

A signal from an AND gate G1 is applied to the switch S1. The switch S1 is conducting while an output from the AND gate 1 is at high level. A control circuit 1 transmits a control signal through a line 130 to one input terminal of the AND gate G1, while a flip-flop F1 applies a signal from an output Q thereof to the other input terminal of the AND gate G1. A data-signal is applied to an input terminal D of the flip-flop F1 through a line 131 by the control circuit 1. The signal already applied to the input terminal D is delivered to the output Q when a signal is sent to a clock input terminal C of the flip-flop F1 through a line 132 by the control circuit 1. The output Q of the flip-flop 1 is reset at low level when the control circuit 1 applies a reset signal to an input terminal R of the flip-flop 1 through a line 133. Flip-flops F1 to F1728 are cascaded, and the other AND gates G2 to G1728 are arranged similarly. These flip-flops F1 to F1728 together with the line 131, 132, and 133 effect a shift register. The common sub-lines l1 to l27 are connected with a high-level bias voltage VB for applying direct-current thereto through resistances R1 to R27, so as to be clamped. These common sub-lines l1 to l27 are communicated with common lines la, lb through R101 to R127. Serial signals from the one group including B1 to B13 photo-detection circuits are led to the one common line la, while serial signals from the other group including the photo-detection circuit B14 to B27 are led to the other common line lb. The signal from the line la is applied to the inverting input terminal of an operational amplifier circuit 2. Meanwhile, the signal from the line lb is applied to the non-inverting input terminal thereof. The output from the operational amplifier circuit 2 is led to a line 1200. This operational amplifier circuit 2 has the fuctions of summing up the signal from the line lb and the inverted signal of the signal from the line la and also of leading the signal thus summed up to the line 1200. The output from the line 1200 is applied to a line 1201 through a buffer 3 and a diode 5, and also applied to the line 1201 through a diode 6 after it is inverted by a buffer 4. The gains of these buffers 3 and 4 are equal to each other. The positive signal from the line 1200 is transmitted through the buffer 3 to the line 1201, while the negative signal from the line 1200 is transmitted to the line 1201 after it is inverted by the buffer 4. Thus the line 1201 is given the positive signal only.

The number of photo-detection units included in the photo-detection circuits B1 to B13 which constitutes the one group is 832 (=13×64), while the number of photo-detection units included in the photo-detection circuits B14 to B27 which constitutes the other group is 896 (=14×64). Thus, these two numbers are substantially equal to each other.

Figure 2:
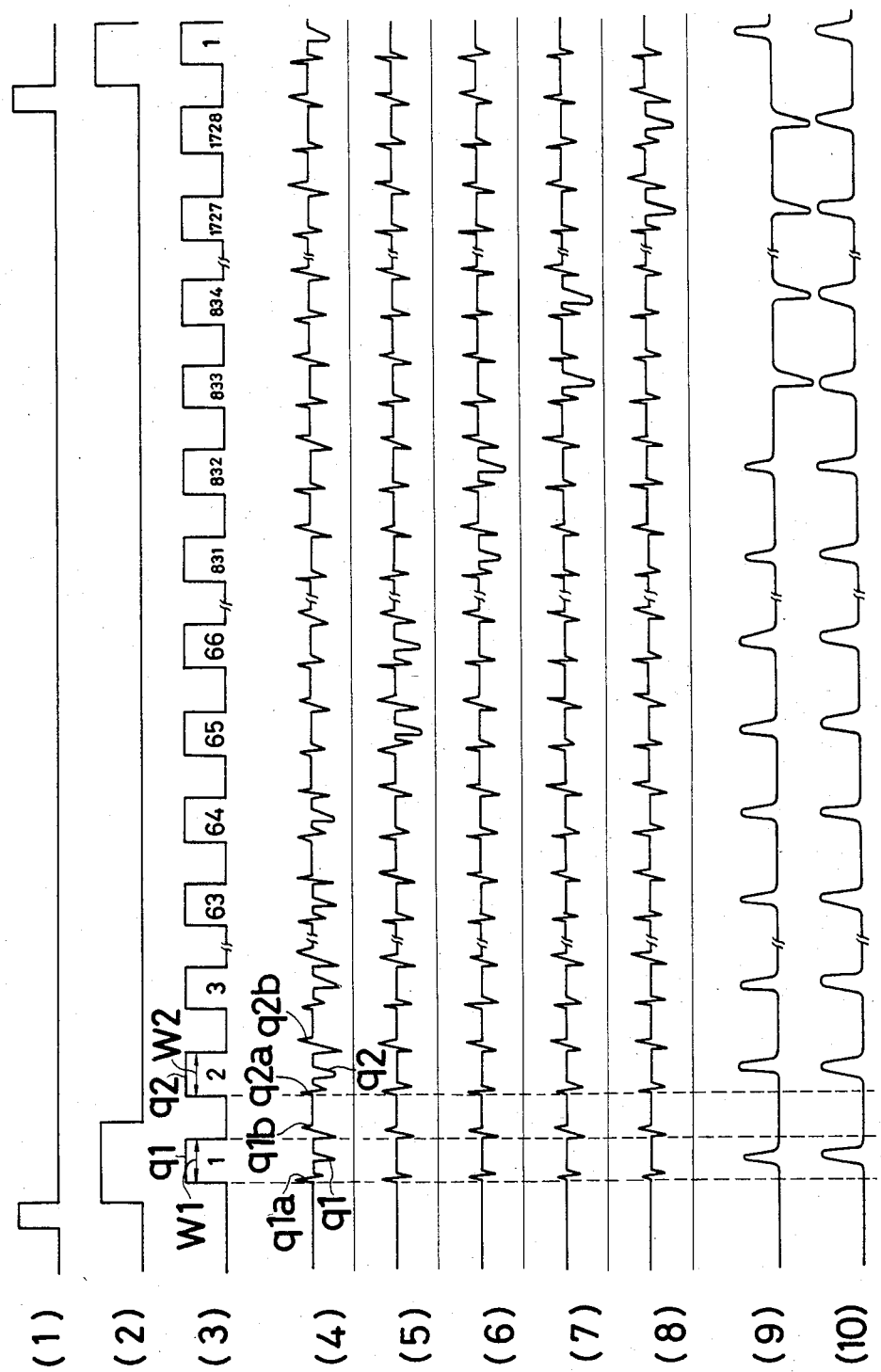
FIG. 2 is a waveform diagram illustrating the operation of the embodiment of FIG. 1.

FIG. 2 is a waveform diagram illustrating the operation of the embodiment of FIG. 1. The outputs Q of flip-flops F1 to F1728 are set at low level when a reset signal as shown in FIG. 2(1) is delivered thereto by the control circuit 1. Thereafter, a data signal having the time period of five milliseconds as shown in FIG. 2(2) is applied to the flip-flop 1 through the line 131. At this time, the control circuit 1 applies a shift signal as shown in FIG. 2(3) to the line 132. Accordingly the output Q of the flip-flop 1 is set at high level when such shift signal is applied thereto. To the line 130 is applied a control signal having the same waveform as that of the shift signal. To the AND gate G1 is consequently applied a signal having the same waveform as that of the shift signal. Therefore, the switch S1 is conducting during the time length W1 defined by the syncronization of such shift signal and control signal. The conduction of the switch 1 allows a detecting signal from the photodiode D1 to be applied to the common sub-line l1. Actually, the common sub-line l1 receives the signal having a waveform as shown in FIG. 2(4). Precisely, to the common sub-line l1 is applied a detecting signal q1 together with noise components q1a, q1b which occur at the rise and fall times of the shift signal. Besides, the control circuit 1 commonly applies a square wave signal to the AND gates G1 to G1728 through the line 130. Accordingly, to these AND gates G1 to G1728 is applied noise which occurs at the rise and fall times of such square wave signal. Such noise is then delivered to the common sub-lines l1 to l27 irrespective of opening/closing actions of the switches S1 to S1728. The noise thus applied to the common sub-lines l1 to l27 has substantially the same waveforms as those of the noise components q1a, q1b as shown in FIG. 2(4).

Next, the output Q of flip-flop F2 is set at high level when a subsequent shift signal is applied thereto. Thus, the switch 2 is rendered conductive. Consequently, to the common sub-line l1 are applied a detecting signal q2 together with noise components q2a, q2b which occur at the rise and fall times of the shift signal. Thus, to the common sub-line l1 are successively delivered signals associated with the photo-detection units U1 to U64 every time the shift signal is produced. Likewise, signals as shown in FIG. 2(5),(6),(7), and (8) are applied to the common sublines l2, l13, l14 and l27, respectively.

Voltage V0 of a line 1200 for an operational amplifier circuit 2 is expressed by the following equation (1):

$$V0 = -G[(vs14 + vn14) + (vs15 + vn15) + (vs16 + vn16) + \ldots + (vs27 + vn27)] - \{(vs1 + vn1) + (vs2 + vn2) + (vs3 + vn3) + \ldots + (vs13 + vn13)\}] \quad (1)$$

where G is the gain of the operational amplifier circuit 2, and vn1 to vn27 are noise introduced into the respective common sub-lines l1 to l27, while vs 1 to vs 27 are the voltages of the respective detecting signals q1 to q27.

Since the number of photo-detection units included in the photo-detection circuits B1 to B13 in the one group is 832 and the number of photo-detection units incorporated in the photo-detection circuits B14 to B17 in the other group is substantially equal to the former, the following equation (2) holds true:

$$vn14 + vn15 + vn16 + \ldots + vn27 = vn1 + vn2 + vn3 + \ldots + vn13 \quad (2)$$

According to the above equations (1) and (2), the following equation (3) also holds true:

$$V0 = -G\{(vs14 + vs15 + vs16 + \ldots + vs27) - (vs1 + vs2 + vs3 + \ldots + vs13)\} \quad (3)$$

Thus, the detecting signals yielded by the photo-detection units U1 to U1728 are successively delivered to the line 1200 with noise components almost or absolutely not contained therein, since, as apparent from these equations, the noise components are canceled. The signal to be applied to the line 1200 has a waveform as shown in FIG. 2(9). The detecting signal yielded by the photo-detection circuits B1 to B13 which constitute the one group is of positive polarity, whereas the detecting signal transmitted by the photo-detection circuits B14 to B27 which make up the other group is of negative polarity. However, any signal to be applied to the line 1201 is of positive polarity as a result of the duties of buffers 3 and 4. Accordingly, the signal thus led to the line 1201, has a waveform as shown in FIG. 2(10).

In the manner as in the foregoing, the noise inconveniently introduced into the common sub-lines 11 to 113; 114 to 127 is canceled, which means that no noise component is applied to the line 1201, thus achieving the excellent signal to noise ratio of the detecting signal. Furthermore, according to this embodiment, clamping voltages in the common lines 1a, 1b which are equal to each other are conveniently canceled.

In this embodiment, the whole photodiodes D1 to D1728 respectively belonging to the photo-detection units U1 to U1728 fall into subgroups each including 64 photodiodes, and the detecting signals yielded by such subgroups are individually received by the common sub-lines 11 to 127. Thus, prevention of decrease in level of the detecting signal applied to the common lines 1a, 1b and the common sub-lines 11 to 127 is enabled, with the result that the deterioration of the sensitivity of the apparatus can be inhibited for the reason described below. Namely, for example, the photodiode D1 is rendered conductive upon receiving light, so that the charge storage capacitor C1 discharges its electric charge. Thereafter, into the photodiode D1 through a line 11a are introduced the electric charges of the charge storage capacitors C2 to C64 respectively associated with the remaining photodiodes D2 to D64 and of the stray input capacitances of the switches S1 to S64, immediately after the switch S1 is closed. In consequence, is decreased the quantity of electric current flowing into the photodiode D1 through R1 during the switch S1 is conducting. According to the invention, the number of photodiodes to be commonly connected with the respective common sub-lines 11 to 127 is diminished to as great an extent as possible, the number being 64 in this embodiment. Thus, prevention of deterioration of sensitivity is permitted.

In another embodiment, the photo-detection units U1 to U1728 may be exactly divided into two groups each including 864 (=1728/2) units, to thereby accomplish the cancellation of noise components even more surely. As aforementioned, in accordance with the invention, the numbers of photo-detection units included in the two groups are determined to be substantially equal to each other. Consequently, noise components are canceled, thereby enabling serial detecting signals with the improved signal to noise ratio to be obtained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A reading apparatus comprising:
   a first group of photo-detection units, said first group of photo-detection units comprising a first plurality of photo-detection units each comprising a photo-detector and a switch connected in series therewith;
   a second group of photo-detection units, said second group of photo-detection units comprising a second plurality of photo-detection units each comprising a photo-detector and a switch connected in series therewith, said second plurality of photo-detection units being substantially equal in number to said first plurality of photo-detection units;
   control means for rendering said switches conductive successively one at a time;
   a first common line for commonly delivering detecting signals from the first group of photo-detection units;
   a second common line for commonly delivering detecting signals from the second group of photo-detection units;
   operational means having a pair of input terminals, one input terminal thereof being supplied with the detecting signal sent from the first common line, the other input terminal thereof being supplied with the detecting signal sent from the second common line, said operational means being adapted to sum up the detecting signal applied to the one input terminal and the inverted signal of the detecting signal applied to the other input terminal.

2. A reading apparatus is claimed in claim 1, wherein said first group of photo-detection units fall into subgroups each comprising a third plurality of photo-detection units which are smaller in number than said first plurality of photo-detection units, and common sub-lines are provided which are individually associated with the respective said subgroups of photo-detection units in said first group whereby said third plurality of photo-detection units in each said subgroup commonly apply outputs thereof to said common sub-line, and said common sub-lines are commonly connected with said first common line.

3. A reading apparatus as claimed in claim 1, wherein said second group of photo-detection units fall into subgroups each comprising a fourth plurality of photo-detection units which are smaller in number than said second plurality of photo-detection units, and common sub-lines are provided which are individually associated with the respective said subgroups of photo-detection units in said second group whereby said fourth plurality of photo-detection units in each said subgroup commonly apply outputs thereof to said common line, and said common sub-lines are commonly connected with said second common line.

4. A reading apparatus claimed in claim 1, further comprising: a first buffer for delivering the output from said operational means at the same polarity; a second buffer for delivering the output from said operational means at the opposite polarity; and means for summing up the outputs from said first and second buffers.

5. A reading apparatus as claimed in claim 1, wherein said control means comprises: AND gates, individually associated with respective said switches, for yielding signals to control on/off actions of said switches; means for commonly applying a square wave pulse to one inputs of said AND gates; and a shift register for applying a square wave pulse to the other inputs of said AND gates successively one at a time and synchronously with applying of the square wave pulse by said pulse applying means.

6. A reading apparatus as claimed in claim 5, wherein said shift register comprises cascaded D-type flip-flops.

* * * * *